Jan. 6, 1959     M. R. NIELSEN     2,867,462
HOUSING CONFINED LIP SEAL
Filed Dec. 28, 1953
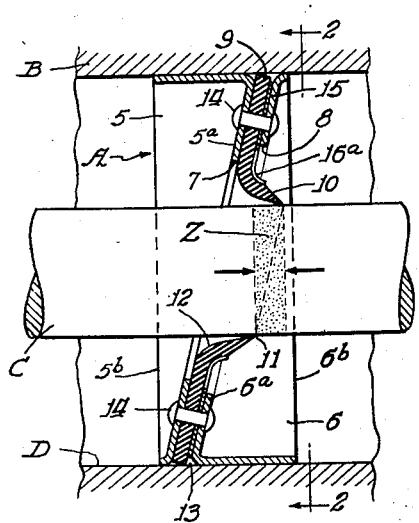
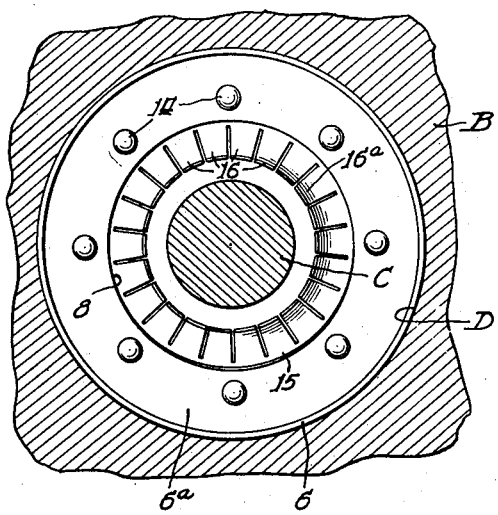
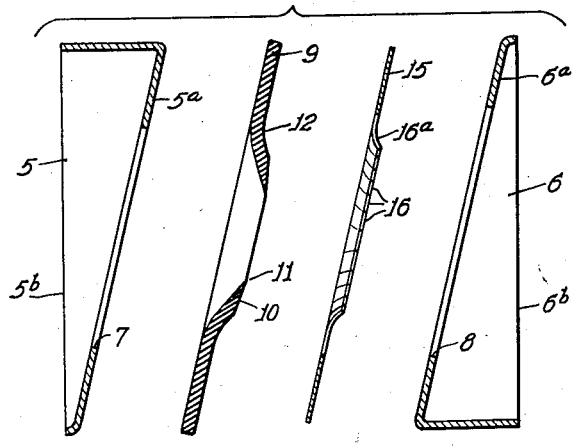
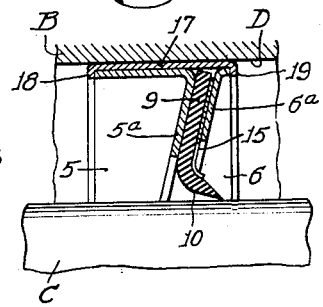
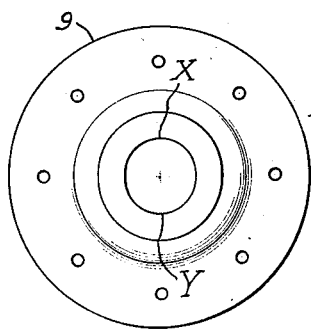
Inventor:
Milton R. Nielsen

United States Patent Office 2,867,462
Patented Jan. 6, 1959

2,867,462

HOUSING CONFINED LIP SEAL

Milton R. Nielsen, Lombard, Ill., assignor to Borg-Warner Corporation, Chicago, Ill., a corporation of Illinois Application December 28, 1953, Serial No. 400,630

3 Claims. (Cl. 288—3)

This invention relates generally to seals between relatively movable parts and particularly to an improved arrangement in combination with a flexible lip-type of seal member.

The currently used lip-type oil seals provide a narrow annular line contact on a shaft. As a result, all frictional heat and wear is thus concentrated in a very small annular area which is perpendicular to the shaft axis. It has been found that increasing the thickness of the seal lip does not help since the seal is effective only at its radially inner edge while other areas receive no lubrication. The usual lip type seals are of leather, rubber or molded material which is more or less yielding particularly at the edge of the lip.

In the present improvements a lip-type seal is arranged in a plane which is oblique or inclined to a plane perpendicular to the axis of the shaft so that when the shaft is moved as in rotation the normal line contact between the seal lip and the shaft is extended over a considerable or wider area than a normal line contact. Consequently, the lip seal inscribes a wide annular band, the axial dimensions of which extend longitudinally of the shaft. It should be understood, however, that in order to provide a definite fit of the seal on the shaft it is preferably made of ellipsoidal contour at least at its inner periphery so that when it is placed in tilted position at a more desirable angle the inner ellipse will define an edge which will be in full and complete contact with the shaft.

One of the principal objects of this invention is not only to provide a novel construction of a seal ring such as contemplated herein, but to materially improve the efficiency and operation of the seal member.

Another object hereof resides in providing a seal ring which insures a wide band of contact between the lip of the seal and the exterior surface of the shaft with which it cooperates, and to accomplish this object in a simple and highly effective manner.

Additional objects, aims and advantages of the present invention will be apparent to persons skilled in the art after the construction and operation of the improved seal ring is understood from the within description.

It is preferred to accomplish the objects of this invention and to practice the same in substantially the manner hereinafter fully described and as more particularly pointed out in the appended claims, reference being now made to the accompanying drawings forming a part of this specification.

In the drawings:

Fig. 1 is a longitudinal section of the improved seal ring mounted between a pair of relatively movable coaxial members and illustrating the manner in which a wide annular area of contact is made between the lip of the seal ring and the rotatable member of the assembly;

Fig. 2 is a transaxial section taken along the plane of line 2—2 of Fig. 1 and looking toward the right-hand face of the seal ring as indicated;

Fig. 3 is an exploded view of exaggerated dimensions to illustrate the structural details of the seal ring;

Fig. 4 is a face elevation of the annular lip-type seal to illustrate the elliptical form of its inner periphery; and, Fig. 5 shows an alternate form of seal ring.

The drawings are to be understood as being more or less of a diagrammatic character for the purpose of disclosing a typical or preferred form of the invention contemplated herein, and in these drawings like reference characters identify the same parts in the different views.

Referring more particularly to Figs. 1 and 2 it will be noted the improved seal assembly A is mounted between relatively movable members B and C, the latter member C defining what may be a rotatable shaft which is coaxial with and spaced from the cylindrical inner surface D of the member B to receive said seal assembly A.

This improved seal assembly A comprises generally a two-piece structure formed by a pair of ungula sections 5 and 6 which may be identical sheet metal stampings so that they will form a cylindrical shell when these sections are placed in coaxial relationship with their oblique surfaces parallel to each other. Each of the sections 5 and 6 has an inwardly extending flange 5a and 6a respectively which lie in planes which are oblique to their respective base portions 5b and 6b. These flanges extend radially inward and their inner peripheries define alined openings 7 and 8 which are preferably of elliptical contour, or circular.

The seal ring or disc 9 may be of any type of material, preferably leather, molded synthetic rubber or other rubber substitutes, the purpose being to provide a seal member having the characteristic of being yieldable or flexible whereby the inner peripheral region will conform to the outer contour of the movable shaft C and exert a wiping action thereon. At its inner periphery this seal ring is chamfered as at 10 thereby to provide a chisel-shaped or tapered lip 11 the free edge of which is adapted to provide a line contact with the outer surface of the shaft in the manner shown in Fig. 1. Although not required, the seal ring 9 is preferably preformed to provide an annular bend 12 at a location that is radially outward from the chamfered region 10, as suggested in Fig. 3.

In assembling the seal structure, the shell sections 5 and 6 are positioned adjacent each other with their oblique flanges 5a and 6a in spaced facing relation as shown in Fig. 1, so that the gap between said flanges will define a channel 13. It will be seen that this channel is oblique to a plane that is perpendicular to the axis of the shell assembly and it is utilized for supporting the seal ring 9 in a predetermined inclined relation to the shaft. It will be seen that the lip 11 normally forms a line contact with the shaft not rotating. However, due the obliquity of the seal ring, the lip 11 is effective to axially increase the contact area during shaft rotation. This increased area of contact is approximately equal to the axial distance between the upper and lower arcs X and Y of the lip edge thereby defining a wide band of contact Z as shown between the heavy arrows on Fig. 1. To hold the seal ring and the shell sections 5 and 6 in assembly, securing means, such as rivets 14, are utilized, said rivets being passed through the flanges 5a and 6a and through the radially outer region of the seal ring 9.

For the purpose of insuring yieldability of the inner annular region of the seal ring, and particularly to maintain definite contact between the lip and the shaft, spring pressure means such as a finger-type pressure spring annulus 15 is interposed between the shell flange 6a and the seal ring 9, said spring annulus being held in position by the rivets 14 that pass through the radially outward body portion of the annulus. The fingers 16 at the inner region of the annulus yieldably contact the seal ring and have their tip portions or radially inner regions curved in an arc as at 16a to avoid injury to the adjacent surface of the seal when the latter is engaged with the shaft. Furthermore, the spring finger tips 16a are spaced radially outward from the shaft surface, thus to avoid scoring the latter in the event the seal ring lip becomes worn through use. It will be appreciated that, in lieu of the spring finger washer 15, the seal ring may be urged into wiping contact with the shaft C by means of a garter spring which may be employed in surrounding relation to the seal ring lip.

In the alternate type shown in Fig. 5, the holding rivets 14 are omitted and the three remaining parts are held together by a cylindrical housing 17 surrounding the assembly and having its end edges inturned or crimped over the adjacent end edge of shell sections 5 and 6 as indicated at 18 and 19 respectively.

While this invention has ben described in detail in its present preferred form or embodiment, it will be apparent to persons skilled in the art, after understanding the construction, operation and function of the improvements, that various changes and modifications may be made therein without departing from the spirit or scope thereof. It is aimed in the appended claims to cover all such changes and modifications.

What is claimed is:

1. An oil seal comprising a yieldable lip-type seal annulus arranged in surrounding relation on a rotatable shaft with the lip of the seal normally in narrow line contact with the shaft surface; and means supporting said annulus comprising a pair of axially aligned shell sections of ungula form arranged with their oblique ends parallel and adjacent each other to define a channel in which said seal annulus is positioned with its lip in a plane oblique to the axis of the shaft; and means separable from said shell sections and securing said sections together to anchor said seal annulus in said channel, the obliquity of the annulus being effective during rotation of the shaft to axially increase said normal line contact by the seal lip to a wide annular band extending longitudinally on the shaft.

2. A seal assembly for arrangement between relatively movable concentrically positioned coaxial members, the inner member defining a rotatable shaft, said seal assembly comprising spaced cylindrical shells within the outer member in surrounding relation to said shaft; and inwardly extending flange on each of said shells in spaced parallel relation to each other to define a channel therebetween that is oblique to the axis of said shaft; a yieldable lip-type seal disc secured in said channel with its lip edge normally in line contact with the shaft surface, said lip edge lying in a plane oblique to the axis of said shaft; spring pressure means yieldably maintaining the lip region of said disc in contact with the shaft surface, a cylindrical member surrounding said shells and having its end edges crimped over the end edges of said shell sections to secure said sections together the oblique disposition of said seal disc being effective during shaft rotation to cause the disc lip to wipe the shaft surface in a broad band having greater area than the normal line contact made by said ring lip.

3. An oil seal comprising a yieldable lip-type seal annulus arranged in surrounding relation on a rotatable shaft with the lip of the seal normally in narrow line contact with the shaft surface; and means supporting said annulus comprising a pair of axially aligned shell sections of ungula form arranged with their oblique ends parallel and adjacent each other to define a channel in which said seal annulus is positioned with its lip in a plane oblique to the axis of the shaft; and spaced rivets securing said shell sections together and anchoring said seal annulus in said channel, the obliquity of the annulus being effective during rotation of the shaft to axially increase said normal line contact by the seal lip to a wide annular band extending longitudinally on the shaft.

References Cited in the file of this patent

UNITED STATES PATENTS

| | | |
|---|---|---|
| 1,358,533 | Elston | Nov. 9, 1920 |
| 1,938,648 | Victor et al. | Dec. 12, 1933 |
| 2,255,613 | Fisher et al. | Sept. 9, 1941 |
| 2,350,697 | Petch | June 6, 1944 |
| 2,398,376 | Hillman | Apr. 16, 1946 |

FOREIGN PATENTS

| | | |
|---|---|---|
| 118,442 | Sweden | Mar. 26, 1947 |